United States Patent [19]

Birmingham et al.

[11] Patent Number: 5,069,821

[45] Date of Patent: Dec. 3, 1991

[54] STABLE SODIUM TETRAPHENYLBORATE SOLUTIONS

[75] Inventors: John M. Birmingham, Platteville; Jeffrey M. Sullivan, Longmont, both of Colo.

[73] Assignee: Boulder Scientific Company, Mead, Colo.

[21] Appl. No.: 310,955

[22] Filed: Feb. 15, 1989

[51] Int. Cl.[5] .......................... H01B 1/00; C09K 3/00; C01G 56/00

[52] U.S. Cl. .................................... 252/500; 252/518; 252/182.12; 252/182.29; 252/182.31; 252/182.3; 252/631; 252/180; 423/12

[58] Field of Search ............... 252/180, 181, 500, 518, 252/182.12, 182.29, 182.31, 182.32, 182.3, 631, 632; 423/12; 210/638

[56] References Cited

U.S. PATENT DOCUMENTS

| | | | |
|---|---|---|---|
| 4,647,440 | 3/1987 | Blasius | 210/638 |
| 4,840,765 | 6/1989 | Doherty et al. | 423/12 |

*Primary Examiner*—Josephine Barr

*Attorney, Agent, or Firm*—Edward S. Irons

[57] ABSTRACT

Stable alkaline aqueous solutions of sodium tetraphenylborate.

5 Claims, No Drawings

STABLE SODIUM TETRAPHENYLBORATE SOLUTIONS

This invention relates to sodium tetraphenylborate in stable aqueous solution.

BACKGROUND OF THE INVENTION

Sodium tetraphenylborate, $NaB(C_6H_5)_4$, is commercially useful for various purposes. It may be included in polymeric compositions to impart electrical conductivity. It has been used to precipitate radioactive cesium 137 impurity from waste water.

For some commercial purposes, it is desirable to provide sodium tetraphenylborate in aqueous solution. More specifically, solutions of sodium tetraphenylborate in dilute aqueous sodium hydroxide are of commercial interest. Such solutions tend to be unstable.

SUMMARY OF THE INVENTION

This invention involves the discovery that sodium tetraphenylborate is stable for a substantial time period in solution in aqueous sodium, lithium, magnesium or calcium hydroxide solutions having a normality of from about 0.07 to about 0.09, preferably about 0.08, when measured by titration with standard hydrochloric acid to an endpoint of pH 7. Sodium tetraphenylborate solutions of this invention are stable at temperature up to at least as high as about 65° C. to about 70° C.

DETAILED DESCRIPTION AND EXEMPLIFICATION OF THE INVENTION

Aqueous sodium tetraphenylborate solutions generally tend to be unstable as evidenced, inter alia, by the release of benzene as one decomposition product.

This invention provides stable aqueous solutions of sodium tetraphenylborate in aqueous sodium, lithium, magnesium or calcium hydroxide having a molarity of from about 0.07 to about 0.09, preferably about 0.08, when measured by titration with standard hydrochloric acid to an endpoint of pH 7. Sodium tetraphenylborate in more concentrated solutions of these hydroxides decomposes with a concomitant reduction to a stabilized metal hydroxide molarity within the 0.07 to 0.09 range. Initial NaOH molarity of substantially less than 0.07 also results in $NaB(C_6H_5)_4$ instability as evidenced by a continuing change in NaOH molarity with time. Similar results are indicated when sodium hydroxide is replaced by lithium hydroxide.

These phenomena as regards sodium hydroxide solutions are illustrated by Table 1:

TABLE 1

| Elapsed Time, Hour | Sample 1 NaOH Conc. | Sample 2 NaOH Conc. | Sample 3 NaOH Conc. | Sample 4 NaOH Conc. |
|---|---|---|---|---|
| 0 | 0.043 M | 0.072 M | 0.100 M | 0.133 M |
| 71 | 0.048 M | 0.074 M | 0.0978 M | 0.130 M |
| 191 | 0.048 M | 0.075 M | 0.0958 M | 0.122 M |
| 429 | 0.266 M | 0.074 M | 0.0895 M | 0.280 M |
| 592 | 0.61 M | 0.075 M | 0.088 M | 0.75 M |

The solutions described in Table 1 were prepared with distilled water, recrystallized 99.5% pure sodium tetraphenylborate and technical grade sodium hydroxide.

Sodium tetraphenylborate concentration was determined gravimetrically by precipitations of potassium tetraphenylborate with potassium hydroxide.

An accelerated aging test of the various solutions in sealed carbon steel containers was carried out at 65° C.+3 .

Aqueous solutions of sodium tetraphenylborate are known to be unstable in acid solution and, as the acidity decreases, the stability increases. Thus, it is unexpected that an increase in the concentration of base (decrease in acidity) becomes destabilizing beyond a certain concentration and that solutions are less stable as the hydroxide concentration increases beyond about 0.09.

In certain commercial embodiments of this invention, the concentration of $NaB(C_6H_5)_4$ is from about 0.25 to about 1.0 molar, preferably from about 0.5 to about 0.75 molar. However, the invention includes stable solutions containing any desired concentration of $NaB(C_6H_5)_4$.

We claim:

1. An aqueous solution of sodium tetraphenylborate in sodium hydroxide or lithium hydroxide, the molarity of hydroxide in said solution being in the range of from about 0.07 to about 0.09, when measured to an endpoint of pH 7, said sodium tetraphenylborate being stable in said solution at a temperature ob 65° C.

2. A solution of sodium tetraphenylborate as defined by claim 1 in which the molarity of sodium hydroxide is about 0.08.

3. A solution of sodium tetraphenylborate as defined by claim 1 or 2 in which the molarity of sodium tetraphenylborate is from about 0.25 to about 1.

4. A solution of sodium tetraphenylborate as defined by claim 1 or 2 in which the molarity of sodium tetraphenylborate is from about 0.5 to about 0.75.

5. An aqueous solution of sodium tetraphenylborate in aqueous sodium hydroxide having a sodium hydroxide molarity of from about 0.07 to about 0.09, when measured to an endpoint of pH 7, said sodium tetraphenylborate being stable in said solution at a temperature of 65° C.

* * * * *